United States Patent Office 3,042,672
Patented July 3, 1962

3,042,672
PRODUCTION OF 3-AMINOPROPYL ISOCYANURATES
Billy E. Lloyd, Memphis, Tenn., assignor to Allied Chemical Corporation, New York, N. Y., a corporation of New York
No Drawing. Filed Mar. 24, 1960, Ser. No. 17,264
4 Claims. (Cl. 260—248)

This invention relates to the production of new and useful 3-aminopropyl isocyanurates.

The objects of the present invention are to provide mono- and bis(3-aminopropyl) isocyanurates and simple and economical processes for their production. Other objects will be apparent from the following detailed description.

The 3-aminopropyl isocyanurates of this invention may be represented graphically by the following formulas:

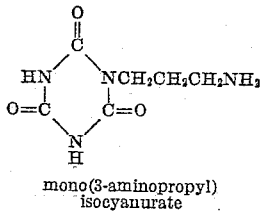
mono(3-aminopropyl) isocyanurate

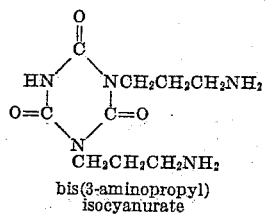
bis(3-aminopropyl) isocyanurate

According to the present invention, these 3-aminopropyl isocyanurates are readily produced in high yield by catalytic hydrogenation of bis- or tris(2-cyanoethyl) isocyanurate in the presence of ammonia.

The bis- and tris(2-cyanoethyl) isocyanurate reactants may be represented graphically by the following formulas:

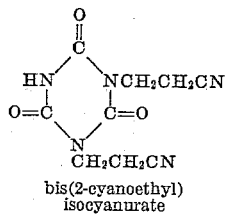
bis(2-cyanoethyl) isocyanurate

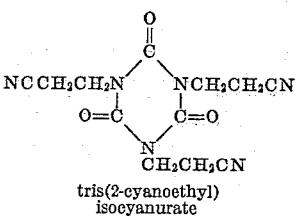
tris(2-cyanoethyl) isocyanurate

Bis- and tris(2-cyanoethyl) isocyanurates may be obtained by reacting cyanuric acid with acrylonitrile in a reaction medium which is a solvent for the reactants and for the 2-cyanoethyl isocyanurates and which contains a small amount of strongly alkaline material as catalyst, as described in application Serial No. 814,671 of Alexander Sadle, filed May 21, 1959. The relative yields of bis- and tris(2-cyanoethyl) isocyanurate can be controlled by varying the proportion of acrylonitrile to cyanuric acid employed and the duration of the reaction. With amounts of acrylonitrile in excess of 3 mols per mol of cyanuric acid, the yield of tris(2-cyanoethyl) isocyanurate is much greater than that of bis(2-cyanoethyl) isocyanurate, and especially when the reaction mixture is maintained at reaction temperature for a sufficient time to permit the cyanoethylation to go to completion. Since tris(2-cyanoethyl) isocyanurate is less soluble than bis(2-cyanoethyl) isocyanurate, they can be separated by fractional crystallization from a solvent.

In carrying out the processes of this invention, the 2-cyanoethyl isocyanurate reactant, ammonia (preferably in anhydrous form) and hydrogenation catalyst are introduced into a pressure-resistant reaction vessel. Hydrogen is added, thereby raising the pressure to the desired value, the vessel being designed so that an excess of hydrogen at the desired pressure will be present. The contents of the reaction vessel are then heated to the desired temperature, and heating is continued for about 0.5 to 6 hours.

On completion of the reaction, the reaction mixture which tends to adhere to the reaction vessel is washed from the vessel with a large quantity, e.g. about 3 to 15 parts by weight per part of reaction mixture, of an inert solvent. Suitable inert solvents include alcohols such as methyl alcohol, ethyl alcohol and isopropyl alcohol, N-methyl pyrrolidone, dimethyl formamide and dimethyl acetamide. If desired, the reaction may be carried out in the presence of such inert solvent in order to form a reaction mixture which is more readily removed from the reaction vessel.

The catalyst is filtered off, and the solvent is then evaporated to give the desired 3-aminopropyl isocyanurate product in crude form. Trimethylenediamine by-product may be removed from the crude product by extraction with a small quantity, e.g. about 1 to 3 parts by weight per part of crude product, of an inert solvent of the type recited above. During the extraction, a small amount of the 3-aminopropyl isocyanurate product is also removed. If desired or required, the product may be further purified by recrystallization from water and then inert solvent.

In general, any suitable hydrogenation catalyst may be employed in the processes of this invention. The metal and free metal-containing hydrogenation catalysts are preferred. Nickel, platinum and palladium, preferably in finely divided form such as Raney nickel, have been found to be particularly suitable catalysts. Other catalysts include cobalt, iron and copper and mixtures thereof.

Depending on the temperature of hydrogenation, one or two cyanoethyl groups may be removed during the processes of this invention. Generally speaking, suitable temperatures range from about 70° to 180° C. High yield of bis(3-aminopropyl) isocyanurate is obtained from tris-(2-cyanoethyl) isocyanurate at temperature of about 70° to 100° C. At temperature of about 130° to 160° C., high yield of mono(3-aminopropyl) isocyanurate is obtained from tris(2-cyanoethyl) isocyanurate. High yield of mono-(3-aminopropyl) isocyanurate is also obtained from bis(2-cyanoethyl) isocyanurate at temperature of about 130° to 160° C.

The ratio of ammonia to 2-cyanoethyl isocyanurate generally ranges from about 3 to 25 mols of ammonia per mol of isocyanurate. Excellent result are obtained in the conversion of tris(2-cyanoethyl) isocyanurate to bis (3-aminopropyl) isocyanurate or bis(2-cyanoethyl) isocyanurate to mono(3-aminopropyl) isocyanurate by use of about 5 to 10 mols of ammonia per mol of isocyanurate and in the conversion of tris(2-cyanoethyl) isocyanurate to mono(3-aminopropyl) isocyanurate by use of about 5 to 20 mols of ammonia per mol of isocyanurate.

Sufficient hydrogen is generally employed to attain pressure of about 1000 to 3000 pounds per square inch gauge at temperature about 70° to 180° C. More specifically, pressure of about 1000 to 1700 pounds per square inch gauge is employed at temperature of about 70° to 100° C. and pressure of about 1800 to 3000 pounds per square inch gauge at temperature of about 130° to 160° C. As the reaction proceeds, the pressure tends to decrease as the hydrogen is absorbed and reacted. We have found it desirable to add additional hydrogen in order to maintain the pressure at the desired value.

The processes of the present invention may be represented by the following general equations:

(1)

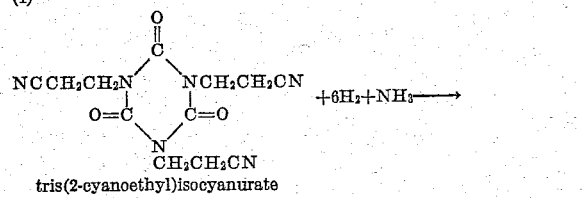

bis(3-aminopropyl)isocyanurate  trimethylenediamine (2)

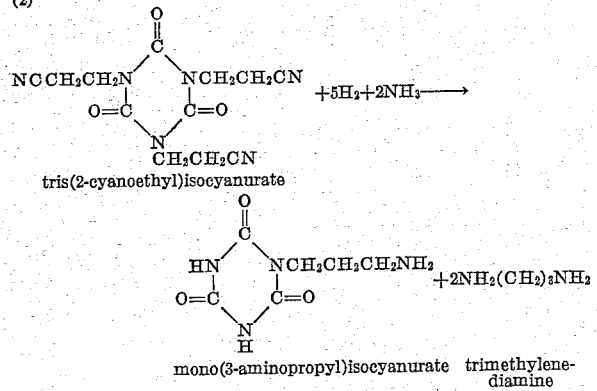

mono(3-aminopropyl)isocyanurate  trimethylenediamine (3)

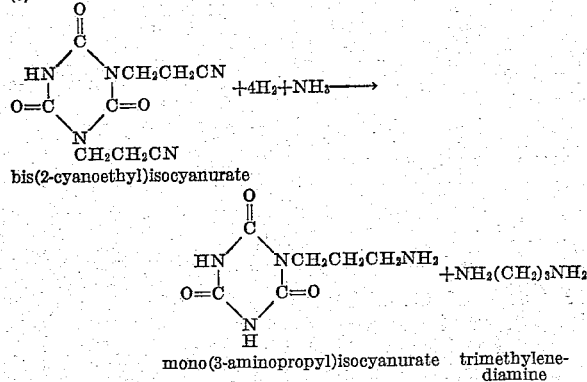

mono(3-aminopropyl)isocyanurate  trimethylenediamine

Although I do not wish the present invention to be limited by any theory, the results obtained may be explained as follows:

(1) Ammonolysis converts tris(2-cyanoethyl) isocyanurate to mono- or bis(2-cyanoethyl) isocyanurate and bis(2-cyanoethyl) isocyanurate to mono(2-cyanoethyl) isocyanurate as follows:

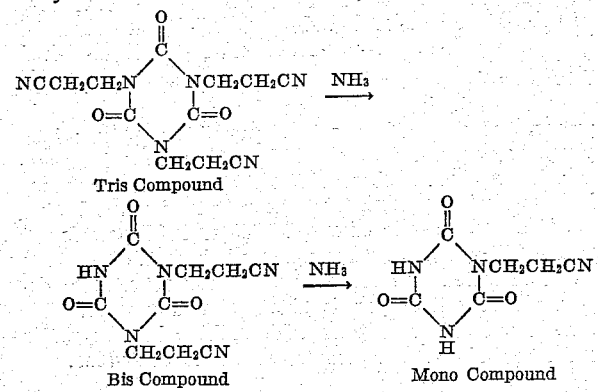

(2) The mono- or bis(2-cyanoethyl) isocyanurate is then catalytically hydrogenated to mono- or bis(3-aminopropyl) isocyanurate.

The following run, in which parts are by weight, illustrates the ammonolysis of tris(2-cyanoethyl) isocyanurate to bis(2-cyanoethyl) isocyanurate.

50 parts of tris(2-cyanoethyl) isocyanurate and 70 parts of anhydrous ammonia were heated in an autoclave at about 80° C. for 4 hours to give 39.1 parts of bis (2-cyanoethyl) isocyanurate having a melting point of 216–218° C. This represented a yield of 96% based on the tris(2-cyanoethyl) isocyanurate charged. A mixed melting point of the product with a known sample of bis(2-cyanoethyl) isocyanurate gave no depression of melting point. Moreover, the infrared spectra of the product and sample were identical.

The following examples, in which parts are by weight, serve to illustrate preferred embodiments of my invention.

*Example 1*

A stainless steel autoclave containing 50 parts of tris-(2-cyanoethyl) isocyanurate, 17.1 parts of Raney nickel and 61.3 parts of anhydrous ammonia was pressurized to 1400 pounds per square inch gauge with hydrogen and heated to 80–82° C. for 5 hours. Additional hydrogen was added as the reaction proceeded to maintain the pressure at about 1200 pounds per square inch gauge. The autoclave was cooled, vented and the product washed from the autoclave with about 250 parts of absolute ethyl alcohol. The catalyst was filtered off, and the ethyl alcohol was then evaporated to give a syrupy mass. Extraction of the syrupy mass with about 50 parts of absolute ethyl alcohol left 23.9 parts of solid bis(3-aminopropyl) isocyanurate having a melting point of 212–215° C. This amounted to a yield of about 57% of theory based on the tris(2-cyanoethyl) isocyanurate charged. When the product was recrystallized from water and then from N-methyl pyrrolidone, the product had a melting point of 205–207° C. The following analytical data for the product were obtained:

|  | Found | Calculated |
|---|---|---|
| Carbon | 34.6 | 34.6 |
| Hydrogen | 3.8 | 3.9 |
| Nitrogen | 25.9 | 26.2 |
| Molecular Weight | [1] 252 | 243 |
| Neutral Equivalent | 126 | 121.5 |

[1] Determined by freezing point depression of water.

*Example 2*

A mixture of 43 parts of tris(2-cyanoethyl) isocyanurate, 79 parts of absolute ethyl alcohol, 15.6 parts of Raney nickel and 18.1 parts of anhydrous ammonia were charged to a stainless steel autoclave and heated to 155–165° C. for 3 hours at 2000 pounds per square inch gage hydrogen pressure. Additional hydrogen was added as the reaction proceeded to maintain the pressure at 1000–2000 pounds per square inch gauge. The autoclave was cooled, vented and the contents washed out with a large quantity of absloute ethyl alcohol. The catalyst was filtered off, and the ethyl alcohol was then evaporated to give 15 parts of crude mono(3-aminopropyl) isocyanurate as a syrupy mass. This amounted to a yield of about 54% of theory based on the tris(2-cyanoethyl) isocyanurate charged. The following analytical data for the product were obtained:

|  | Found | Calculated |
|---|---|---|
| Carbon | 39.1 | 38.8 |
| Hydrogen | 5.6 | 5.4 |
| Nitrogen | 30.1 | 30.1 |
| Neutral Equivalent | 187 | 186 |

The 3-aminopropyl isocyanurates prepared by the process of the present invention may be converted into trimethyleneurea by heating the isocyanurates at temperature of about 165° to 300° C., preferably at low pressure, as described in my copending application of even date, serial Number 17,265. Trimethyleneurea may then be reacted with formaldehyde to form dimethylol trimethyleneurea, a textile resin that makes effective crease-resistant finishes on cotton goods.

Various changes and modifications may be made in the invention without departing from the spirit thereof. For example, the processes of the invention may be adapted to intermittent or continuous, as well as batch, operation.

I claim:

1. A process for producing mono(3-aminopropyl) isocyanurate which comprises reacting tris(2-cyanoethyl) isocyanurate with hydrogen and ammonia in the presence of a metallic nickel catalyst at pressure of about 1800 to 3000 pounds per square inch gauge and at temperature of about 130° to 160° C., and separating mono(3-aminopropyl) isocyanurate from the resulting reaction mixture.

2. A process for producing bis(3-aminopropyl) isocyanurate which comprises reacting tris(2-cyanoethyl) isocyanurate with hydrogen and ammonia in the presence of a metallic nickel catalyst at pressure of about 1000 to 1700 pounds per square inch gauge and at temperature of about 70° to 100° C., and separating bis(3-aminopropyl) isocyanurate from the resulting reaction mixture.

3. A process for producing mono(3-aminopropyl) isocyanurate which comprises reacting bis(2-cyanoethyl) isocyanurate with hydrogen and ammonia in the presence of a metallic nickel catalyst at pressure of about 1800 to 3000 pounds per square inch gauge and at temperature of about 130° to 160° C., and separating mono(3-aminopropyl) isocyanurate from the resulting reaction mixture.

4. A process for producing 3-aminopropyl isocyanurates which comprises reacting a material selected from the group consisting of bis(2-cyanoethyl) isocyanurate and tris(2-cyanoethyl) isocyanurate with hydrogen and ammonia in the presence of a metallic hydrogenation catalyst selected from the group consisting of nickel, platinum, palladium, cobalt, iron and copper at temperature of about 70° to 180° C.

References Cited in the file of this patent

FOREIGN PATENTS

| 404,744 | Great Britain | Jan. 25, 1934 |
| 457,621 | Great Britain | Dec. 2, 1936 |

OTHER REFERENCES

Corse et al.: J. Am. Chem. Soc., vol. 68, pages 1905–1913 (1946).

Schaefer: J. Am. Chem. Soc., vol. 77, pages 5922 to 5928 (1955).